P. G. ROONEY.
APPARATUS FOR THE RE-DISTILLATION OF SPIRITS.
No. 189,578. Patented April 17, 1877.
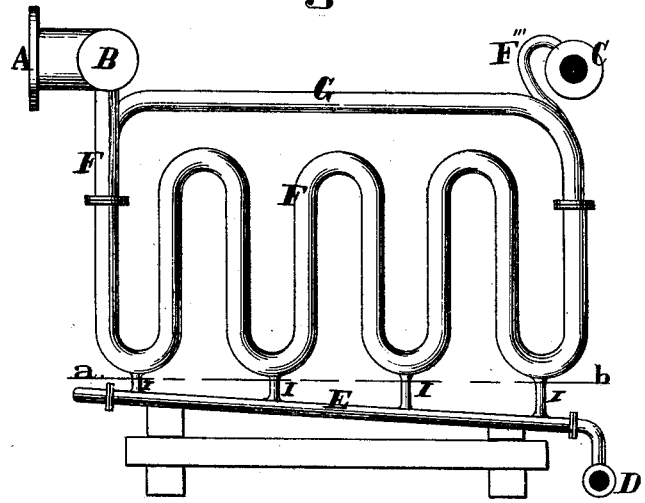
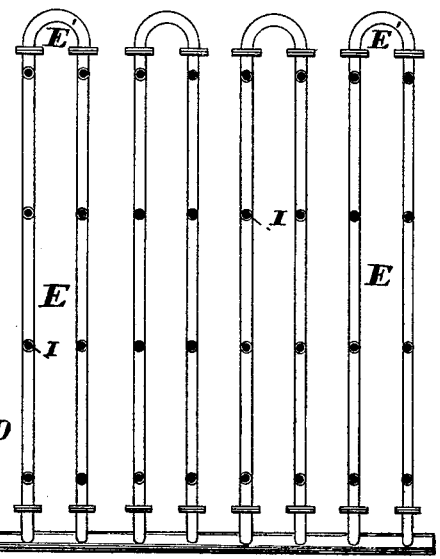
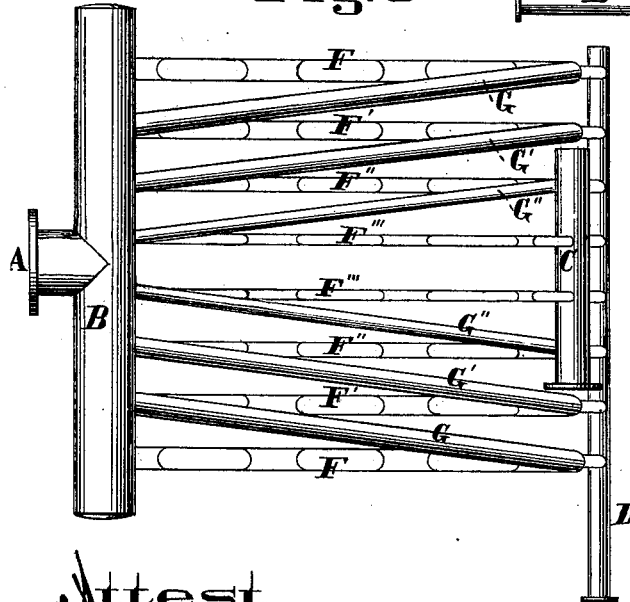
Attest
John O'Gara
Yeatman Bicsthaus
Inventor
P. G. Rooney
by Wood & Boyd
attys.

UNITED STATES PATENT OFFICE.

PATRICK G. ROONEY, OF CINCINNATI, OHIO.

IMPROVEMENT IN APPARATUS FOR THE REDISTILLATION OF SPIRITS.

Specification forming part of Letters Patent No. 189,578, dated April 17, 1877; application filed April 22, 1876.

*To all whom it may concern:*

Be it known that I, PATRICK G. ROONEY, of Cincinnati, in the county of Hamilton and State of Ohio, have invented certain new and useful Improvements in Apparatus for the Redistillation of Spirits, of which the following is a specification:

The invention relates to a condenser; and consists in the peculiar arrangement of a series of coils, situated in a water-vessel between the column-still and worm-condenser of ordinary use, and so constructed as to keep the vapor flowing in one direction while passing through the coils, the pipe of which gradually diminishes in size from the first to the last of the series.

The object of the invention is to obviate what is commonly known as backlash, and to thoroughly remove from the vapor, previous to its passage into the ordinary worm-condenser, all extraneous matter, such as fusel-oil, and by this means to deliver the spirits at a very high "sweet" proof.

Figure 1 is a side elevation of the invention; Fig. 2, a section through the line $a\ b$, Fig. 1; and Fig. 3 is a plan of the apparatus.

B is a large vapor-drum, which receives the vapor from the column-still through the pipe A. C is an outlet vapor-drum connecting with the condenser or worm.

The invention is shown in two series of coils, but it is obvious that any number may be employed.

F represents the coil of greatest diameter in its series, and the only one connected with the inlet vapor-drum B. The vapor, having passed through F, is conveyed to the next coil F', at the same side of the apparatus that it entered, by means of the return-pipe G, and, passing through the coil F', is returned in the same manner by means of the pipe G', and so on until the vapor has passed through each coil of series, when it enters the outlet-drum, as shown at F''', Fig. 1, and thence to the condenser-worm.

E E are pipes, one of which is immediately under each coil, and connected therewith, as shown at I, Fig. 1; I also being a pipe connecting an aperture in the coil with E. The free ends of the return-pipes E are connected by auxiliary bends, as shown at E', which allow backlash, if any should occur, to pass around into the adjoining pipe.

In operation, the fusel-oil and all the heavier substances in the vapor condense at the lower turns of each coil, and, passing through the connecting-pipes I, enter the return-pipes E, and flow to the larger pipe D, and from thence return to the column-still. The pipes E are made to connect with the receiving-pipe D on top, as shown in Fig. 1, in order that the stream from one pipe may not obstruct that from another.

I claim—

In combination with the drum B and the pipe F''', leading to the condenser, the separator composed of two or more coiled pipes, F and F, the return-pipes G and G, and the pipes E, connecting with the pipes F F by means of the pipes I, the whole arranged to operate substantially as described.

In testimony whereof I have hereunto set my hand this 14th day of April, 1876.

P. G. ROONEY.

Witnesses:
 EDWARD BOYD,
 JOHN O'GARA.